(12) United States Patent
Johnson

(10) Patent No.: US 10,262,357 B2
(45) Date of Patent: Apr. 16, 2019

(54) SYSTEMS, METHODS AND PROCESSES FOR CONDUCTING AND/OR COMPLETING ONE OR MORE COMPUTER-IMPLEMENTED AUCTIONS IN REAL-TIME

(71) Applicant: IGOT IT!, L.L.C., Morristown, NJ (US)

(72) Inventor: Peter B Johnson, New Vernon, NJ (US)

(73) Assignee: IGOT IT!, L.L.C., Morristown, NJ (US)

(*) Notice: Subject to any disclaimer, the term of this patent is extended or adjusted under 35 U.S.C. 154(b) by 292 days.

(21) Appl. No.: 14/701,855

(22) Filed: May 1, 2015

(65) Prior Publication Data

US 2015/0317725 A1    Nov. 5, 2015

Related U.S. Application Data

(60) Provisional application No. 61/987,223, filed on May 1, 2014, provisional application No. 62/093,591, filed on Dec. 18, 2014.

(51) Int. Cl.
| | | |
|---|---|---|
| *G06Q 30/08* | (2012.01) | |
| *H04W 4/21* | (2018.01) | |
| *H04W 4/021* | (2018.01) | |
| *H04W 4/20* | (2018.01) | |
| *H04W 4/80* | (2018.01) | |
| *H04W 4/00* | (2018.01) | |
| *H04W 4/04* | (2009.01) | |

(52) U.S. Cl.
CPC ............ *G06Q 30/08* (2013.01); *H04W 4/021* (2013.01); *H04W 4/206* (2013.01); *H04W 4/21* (2018.02); *H04W 4/008* (2013.01); *H04W 4/04* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 7,228,287 B1* | 6/2007 | Samson ................. | G06Q 30/02 705/14.13 |
| 9,697,479 B2* | 7/2017 | Stamler ................. | G06Q 10/02 |

(Continued)

*Primary Examiner* — Nicholas D Rosen
(74) *Attorney, Agent, or Firm* — Norris McLaughlin, P.A.

(57) ABSTRACT

Systems and methods conduct one or more real-time auctions during a live event at a venue, wherein the one or more real-time auctions comprise at least one auction item and/or service. The system and methods comprises digital mobile application software downloaded to a first digital mobile device, at least one positioning system configured to determine when the first digital mobile device is located within or near the venue and a computer server in digital communication with the at least one positioned system and the first digital mobile device. The computer server transmits information indicative of a real-time auction to the first digital mobile device when the first digital mobile device is located within or near the venue during the live event, wherein the computer server receives data indicative of at least one first auction bid for the at least one auction item and/or service from the first digital mobile device via the digital mobile application software executed by the first digital mobile device.

9 Claims, 3 Drawing Sheets

(56) References Cited

U.S. PATENT DOCUMENTS

| | | | | |
|---|---|---|---|---|
| 2002/0059114 | A1* | 5/2002 | Cockrill | G06Q 20/04 |
| | | | | 705/26.81 |
| 2005/0027888 | A1* | 2/2005 | Juszkiewicz | G10H 1/0058 |
| | | | | 709/250 |
| 2009/0150237 | A1* | 6/2009 | Gupta | G06Q 30/0267 |
| | | | | 705/14.64 |
| 2009/0328144 | A1* | 12/2009 | Sherlock | G06F 21/10 |
| | | | | 726/2 |
| 2010/0057601 | A1* | 3/2010 | Bouhana | G06Q 20/102 |
| | | | | 705/37 |
| 2010/0064018 | A1* | 3/2010 | Luo | G06F 17/30905 |
| | | | | 709/206 |
| 2011/0145087 | A1* | 6/2011 | Daman | G06Q 30/08 |
| | | | | 705/26.3 |
| 2012/0078667 | A1* | 3/2012 | Denker | G06Q 10/02 |
| | | | | 705/5 |
| 2012/0218127 | A1* | 8/2012 | Kroen | G08G 5/0034 |
| | | | | 340/945 |
| 2013/0179249 | A1* | 7/2013 | Easterly | G06Q 20/3274 |
| | | | | 705/14.34 |
| 2013/0214042 | A1* | 8/2013 | Kingston | G06Q 40/02 |
| | | | | 235/379 |
| 2014/0006070 | A1* | 1/2014 | Stamler | G06Q 10/02 |
| | | | | 705/5 |
| 2014/0115437 | A1* | 4/2014 | Bhatt | G06F 17/248 |
| | | | | 715/230 |
| 2014/0195332 | A1* | 7/2014 | Grauer | G06Q 30/0243 |
| | | | | 705/14.42 |
| 2015/0120483 | A1* | 4/2015 | Ono | G06Q 30/08 |
| | | | | 705/26.3 |
| 2016/0042364 | A1* | 2/2016 | Zamer | G06Q 30/0201 |
| | | | | 705/7.29 |

* cited by examiner

SYSTEMS, METHODS AND PROCESSES FOR CONDUCTING AND/OR COMPLETING ONE OR MORE COMPUTER-IMPLEMENTED AUCTIONS IN REAL-TIME

CROSS REFERENCE TO RELATED APPLICATION

This application claims the benefit of U.S. Provisional Patent Application Nos. 61/987,223, filed May 1, 2014, and 62/093,591, filed Dec. 18, 2014, their entireties of which is hereby incorporated by reference into this application.

FIELD OF THE DISCLOSURE

The present systems, methods and processes utilize at least one digital mobile application and a digital device for marketing, auctioning and/or selling one or more collectible memorabilia items, one or more experiences and/or one or more upgrades in real-time at live events, such as, for example, sports and/or entertainment events being held at a venue that may be local with respect to a digital device.

SUMMARY OF THE DISCLOSURE

In embodiments, systems and methods conduct one or more real-time auctions during a live event at a venue, wherein the one or more real-time auctions comprise at least one auction item and/or service. The systems and/or methods may comprise digital mobile application software downloaded to a first digital mobile device, at least one positioning system configured to determine when the first digital mobile device is located within or near the venue, and a computer server in digital communication with the at least one positioned system and the first digital mobile device, wherein the computer server transmits information indicative of a real-time auction to the first digital mobile device when the first digital mobile device is located within or near the venue during the live event, wherein the computer server receives data indicative of at least one first auction bid for the at least one auction item and/or service from the first digital mobile device via the digital mobile application software executed by the first digital mobile device.

In an embodiment, the systems and/or methods may comprise a second digital mobile device transmits a second auction bid to the computer server via digital mobile application software executed by the second digital mobile device.

In an embodiment, before transmission of the second auction bid, the second digital mobile device may be positioned within or near the venue during the live event.

In an embodiment, a winning auction bid for the real-time auction may be received at the computer server from the first digital mobile device or the second digital mobile device.

In an embodiment, the live event may be a live sports event and/or a live entertainment event.

In an embodiment, the at least one auction item and/or service may comprise one or more collectible memorabilia items, one or more experiences associated with the live event and/or the venue and/or one or more upgrades associated with the live event and/or the venue.

In an embodiment, the real-time auction may be a flash bid auction wherein time increments drive an auction process of the flash bid auction.

In embodiments, systems and/or computer-implemented methods conduct and/or complete one or more real-time auctions during a live event hosted at a venue. The systems and/or methods may comprise determining that a plurality of digital mobile devices are located within or near the venue during the live event, transmitting information indicative of a real-time auction from a computer server to the plurality of digital mobile devices while the plurality of digital mobile devices are located within or near the venue during the live event, and receiving, at the computer server, auction bids for the real-time auction from the plurality of digital mobile devices located within or near the venue during the live event, wherein the plurality of digital mobile devices execute digital mobile application software to receive the information and transmit the auction bids.

In an embodiment, at least one positioning system may determine that the plurality of digital mobile devices is located within or near the venue during the live event.

In an embodiment, the systems and/or methods may further comprise receiving a winning auction bid from one digital mobile device located within or near the venue during the live event.

In an embodiment, the live event may be a live sports event and/or a live entertainment event.

In an embodiment, an auction item and/or service of the real-time auction may comprise one or more collectible memorabilia items, one or more experiences associated with the live event and/or the venue and/or one or more upgrades associated with the live event and/or the venue.

In an embodiment, the real-time auction may be a flash bid auction wherein time increments drive an auction process of the flash bid auction.

In embodiments, systems and/or computer-implemented methods conduct and/or complete at least one flash bid auction in real-time during a live event hosted at a venue, wherein time increments drive an auction process of the flash bid auction. The systems and/or methods may comprise determining that a plurality of digital mobile devices are located within or near the venue during the live event, transmitting information indicative of the flash bid auction from a computer server to the plurality of digital mobile devices while the plurality of digital mobile devices are located within or near the venue during the live event, receiving, at the computer server, a first auction bid at a start pricing point from one the plurality of digital mobile devices are located within or near the venue during the live event, increasing the pricing point from the start pricing point to higher pricing points after one or more time increments have expired, and receiving, at the computer server, higher auction bids from the plurality of digital mobile devices while located within or near the venue during the live event until a highest or final auction bid is received from one of the plurality of digital mobile device located within or near the venue during the live event, wherein the plurality of digital mobile devices execute digital mobile application software to receive the information and transmit the auction bids.

In an embodiment, at least one positioning system may determine that the plurality of digital mobile devices is located within or near the venue during the live event.

In an embodiment, the live event may be a live sports event and/or a live entertainment event.

In an embodiment, an auction item and/or service of the flash bid auction may comprise one or more collectible memorabilia items, one or more experiences associated with the live event and/or the venue and/or one or more upgrades associated with the live event and/or the venue.

In an embodiment, another digital mobile device of the plurality of digital mobile devices may drop out of the flash bid auction by not transmitting a higher bid at a higher pricing point than the start pricing point, wherein data or information indicative of the highest bid transmitted by the another digital mobile device is collected by the computer server.

In an embodiment, the systems and/or methods may further comprise offering a secondary good or service for sale to the another digital mobile device, wherein the secondary good or service is based on the data or information collected by the computer server.

In an embodiment, a price point of the secondary good or service may be based on the highest bid transmitted by the another digital mobile device.

DETAILED DESCRIPTION OF THE DISCLOSURE

Figure 1:
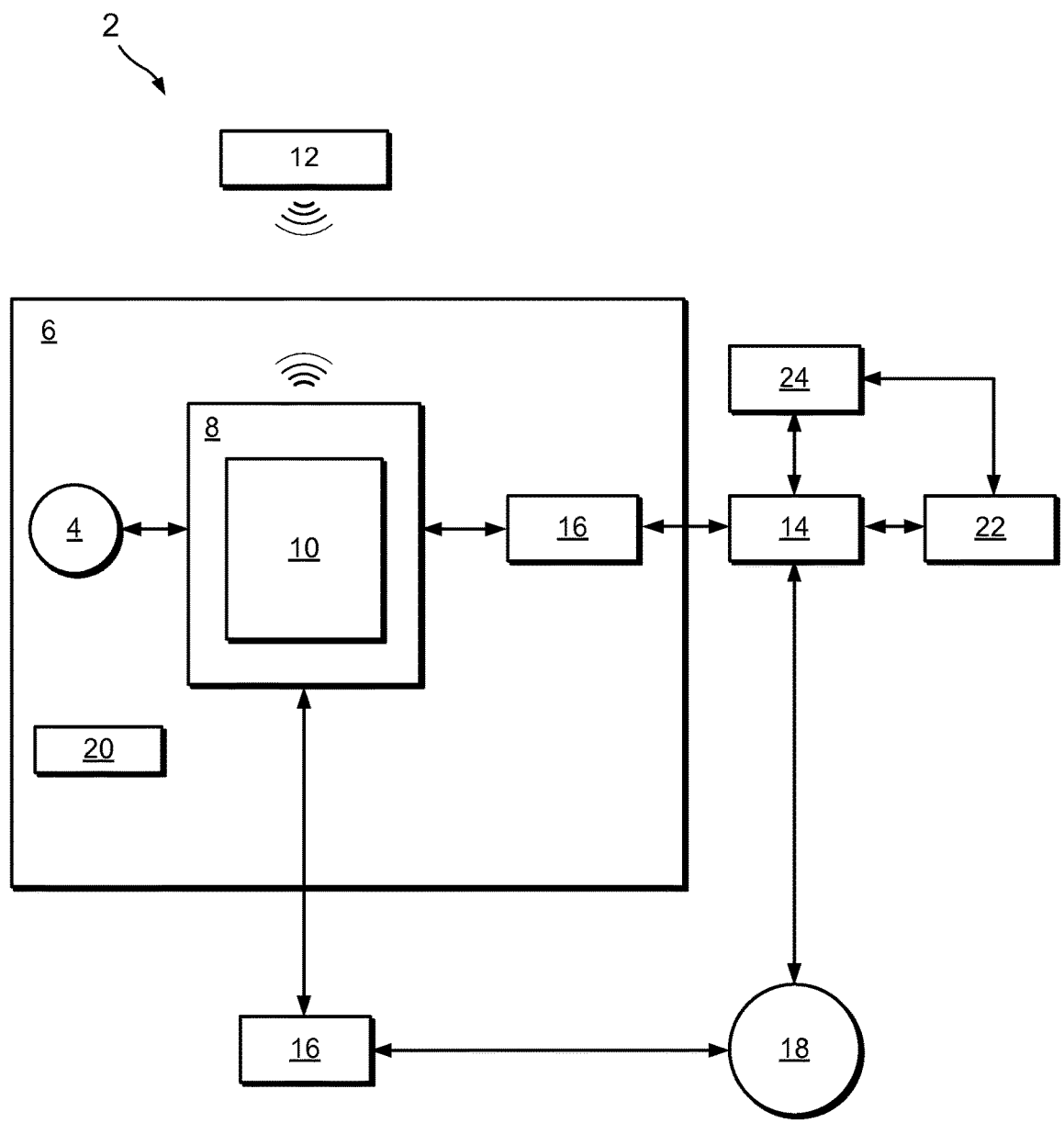
FIG. 1 illustrates a system for conducting and/or completing auctions in real-time in an embodiment.

Referring now to the drawings wherein like numerals refer to like parts, FIG. 1 shows a computer-implemented system 2 (hereinafter "system 2") for conducting and completing one or more auction sales in real-time. The system 2 is a computer system which may comprise one or more of the following system components, such as, more than one user 4, a sports and/or entertainment venue 6 (hereinafter "venue 6"), more than one digital mobile device 8 (hereinafter "device 8"), at least one downloaded or downloadable digital mobile application software 10 (hereinafter "application 10"), at least one positioning system 12, at least one computer server 14 (hereinafter "server 14"), at least one wireless communication network 16 (hereinafter "network 16"), at least one cloud computing system 18, at least one actual, physical and/or tangible memorabilia item 20 (hereinafter "item 20"), at least one database 22 (hereinafter "database 22") and/or at least one third-party financial account 24 (hereinafter "account 24"); and The auction may be, but is not limited to, an English auction, a Dutch auction, a sealed first-price auction or blind auction, a Vickrey auction, a multiunit auction, an all-pay auction, a bidding fee auction, a buyout auction, a combinatorial auction, a generalized second-price auction, a Japanese auction, a Lloyd's syndicate auction, a mystery auction, no-reserve auction, a reserve auction, a reverse or declining auction, a senior auction, a silent auction, a top-up auction, a Walrasian auction, a simultaneous ascending auction, an Anglo-Dutch auction, a private value auction, a common value auction and/or the like. In embodiments, the auction may be, but is not limited to a government auction, a bankruptcy auction, a general auction, a motor vehicle and car auction, a police auction, a land & property auction, an antique and collectibles auction, an Internet auction and/or an on-site auction. In an embodiment, the auction is an on-site auction being conducted and/or completed at the venue 6 before, during or after sports and/or entertainment event.

The user 4 may be physically present at the venue 6 where at least one live sports and/or entertainment event (hereinafter "event") is being hosted, held, staged, performed and/or conducted. In embodiments, sports events may include or be related to, for example, but not limited to, college football, golf, tennis, NFL, boxing, MLB, NBA, NHL, college basketball, skiing, snowboarding, UFC, college hockey, Arena League Football, Major League Lacrosse, college baseball, softball, WWF, track and field, Olympics, a local, state, regional or national sports competition, minor league sports, such as, for example, MiLB and/or NBDL and/or the like. The entertainment event may be, for example, but not limited to, a musical concert, a movie, a play, a theatre performance, such as, for example, a Broadway performance and/or the like. It should be understood that the present disclosure is not limited to a specific embodiment of the sports event and/or entertainment event.

In embodiments, the device 8 may include, or may be, a stationary electronic device and/or a wireless electronic media device, such as, for example, a personal computer (hereinafter "PC"), a tablet PC, an ultra-mobile PC, a mobile-based pocket PC, an electronic book computer, a laptop computer, a video game console, a digital projector, a digital television, a digital radio, a media player, a portable media device, a PDA, an enterprise digital assistant and/or the like. In other embodiments, the device 8 may be, for example, a hyper local digital device, a location-based digital device, a GPS-based digital device, a mobile device (i.e., a 4G smart mobile device, a 3G smart mobile device or the like), an ALL-IP electronic device, an information appliance or a personal communicator. It should be understood that the present disclosure is not limited to a specific embodiment of the device 8. In yet other embodiments, the device 8 may be any digital mobile device capable of installing, storing, executing and utilizing the application 10 as known to one of ordinary skill in the art.

The device 8 may have at least one display (not shown in the drawings) for displaying or rendering information and/or multimedia data that is (i) stored in a memory or at least one digital storage device (not shown in the drawings) accessible by a microprocessor (not shown in the drawings) of the device 8, (ii) streamed to the device 8 via the network 16, (iii) accessible via the cloud computing system 18, or (iv) any combinations thereof. In an embodiment, the display of the device may be, or may include, a touch-screen graphic user interface (hereinafter "GUI") or a digitized screen (not shown in the drawings) connected to the microprocessor of the device 8. In an embodiment, a keyboard (not shown in the drawings) may be connectable to the device 8 for operating the GUI. The device 8 may display or render one or more internet-accessible resource (hereinafter "internet-accessible resources") to the user 4 associated with and/or executing the present methods and/or processes of conducting and completing one or more computer-implemented auctions in real-time. The internet-accessible resources may include one or more web sites, one or more web-based applications, at least one digital mobile application, one or more web pages, digital media content, digital multimedia files, digital audio and/or video files, digital information, electronic documents and/or images, IP addresses, e-mail servers and combinations therefore that may be accessible by the system 2 via at least one selected from the device 8, the application 10, the server 14, the network 16, the cloud computing system 18 and the database 22. It should be understood that the present disclosure is not limited to a specific embodiment of the internet-accessible resources by the device 8.

The internet-accessible resources may be based on, associated with and/or related to one or more goods and/or services being offered for sale during the computer-implemented auction. In embodiments, the internet-accessible resources may be based on, associated with and/or related to the one or more collectible memorabilia items, one or more experiences and/or the one or more upgrades being offered for sale during the computer-implemented auction being conducted and/or completed at the venue 6 during the event. For example, internet-accessible resources may be and/or may include digital information, one or more digital photographs and/or one or more digital videos comprising at least one item 20, one or more individuals associated with the venue 6 and/or the event and/or one or more features associated with the venue 6 and/or the event, such as, a digital photograph showing a box suite or box seating. The internet-accessible resources may include information and/or data directed to the specifications of the at least one item 20, experiences and/or upgrades being offered for sale during the computer-implemented auction.

The internet-accessible resources may include information and/or data based on, associated with and/or relating to the specifications of the computer-implemented auctions being conducting in real time. In embodiments, the internet-accessible resources may include information and/or data based on, associated with and/or relating to one or more past auction bids, current auction bids, a length or duration of time of the auction, a length or duration of time before the auction is completed or closed. For example, the internet-accessible resources may include or indicate the current highest bid, the current highest bidder and the amount of time remaining before the computer-implemented auction is completed and/or closed.

In embodiments, the device 8 may have one or more communication components (not shown in the drawings) for connecting to and/or communicating with the network 16. In an embodiment, the one or more communication components of the device 8 may be a wireless transducer, such as, for example, a wireless sensor network device, such as, for example, a Wi-Fi network device, a wireless ZigBee device, an EnOcean device, an ultra-wideband device, a wireless Bluetooth device, a wireless Local Area Network (hereinafter "LAN") accessing device, a wireless IrDA device and/or the like.

The device 8 may connect to and/or may access the network 16 via the one or more communication components of the device 8. In an embodiment, the device 8 may be connected to and/or in digital communication with the server 14, the database 22 and/or the account 24 via the network 16 and/or the cloud computing system 18. As a result, internet-accessible resources may be transmitted between the device 8, the server 14, the database 22 and/or the account 24 via the network 16 and/or the cloud computing system 18. Moreover, the device 8 may be in digital communication with the server 14, the database 22 and/or the account 24 and may receive the internet-accessible resources from the server 14, the database 22 and/or the account 24 via the network 16 and/or the cloud computer system 18. In embodiments, the internet-accessible resources and/or one or more digital communications may be pushed, transmitted and/or forwarded to the device 8 upon opening, installing and/or activating the application 10 via the device 8. In an embodiment, the system 2 automatically pushes, transmits and/or forwards the internet-accessible resources and/or the one or more digital communications to the device 8 immediately at the open or beginning of the computer-implemented auction. In an embodiment, the system 2 may automatically transmit a digital communication to the device 8 indicating that the computer-implemented auction has begun via application 10, the network 16 and/or the cloud computing system 18.

The database 22 may be a memory or storage medium that is local with respect to the server 14 or may located remotely with respect to the server 14 whereby "remotely" means positioned at a different physical location than the server 14. Similar to the database 22, the positioning system 12 and/or the account 24 may be located locally or remotely with respect to the server 14 and/or the device 8. In an embodiment, the system 2 and/or the database 22 may comprise one or more additional computer systems (not shown in the drawings) and/or may be distributed across multiple servers or data centers (not shown in the drawings).

Figure 2:
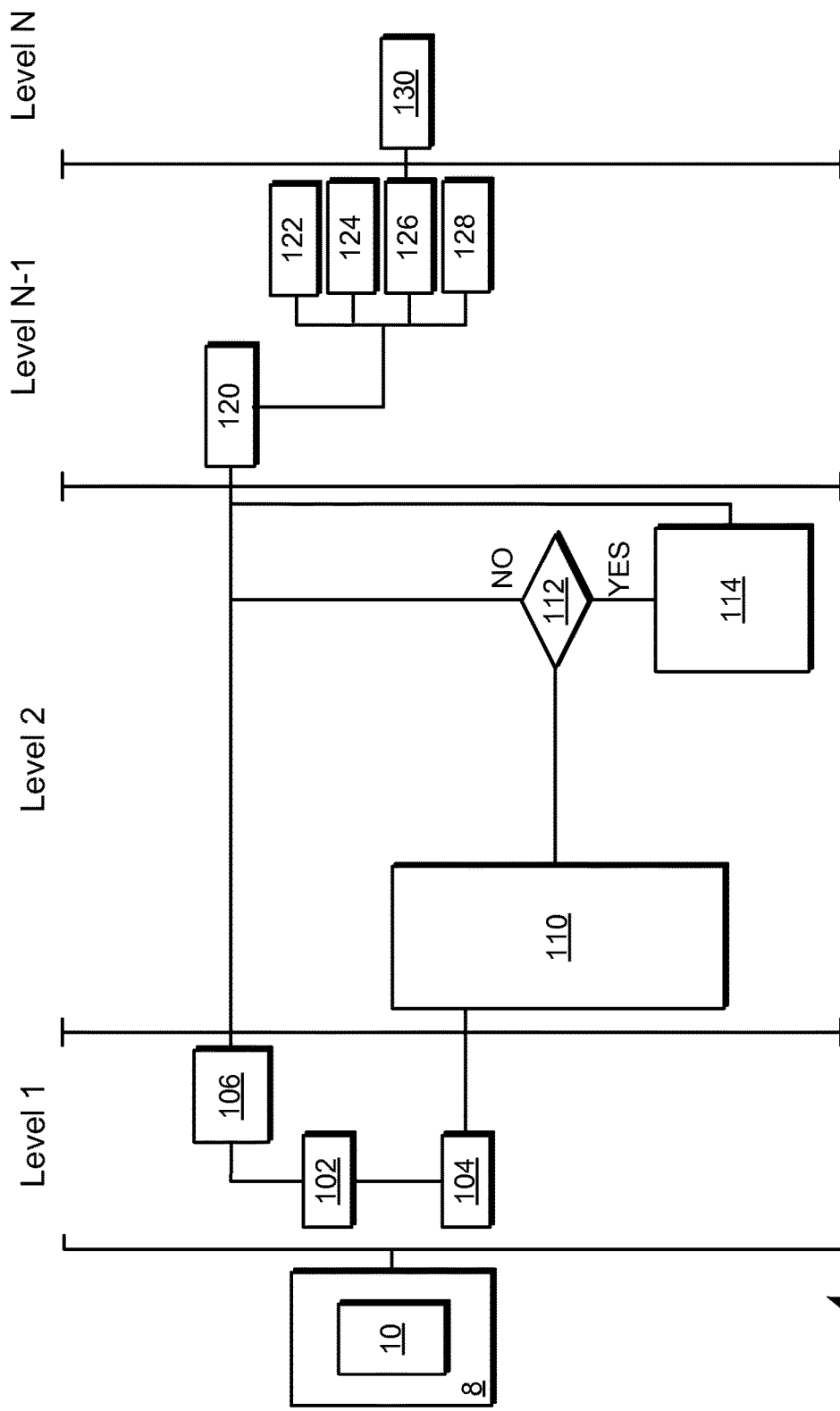
FIG. 2 illustrates a method or process comprising a plurality of levels for opening and/or executing a downloadable digital mobile application installed on a digital device in an embodiment.
Figure 3:
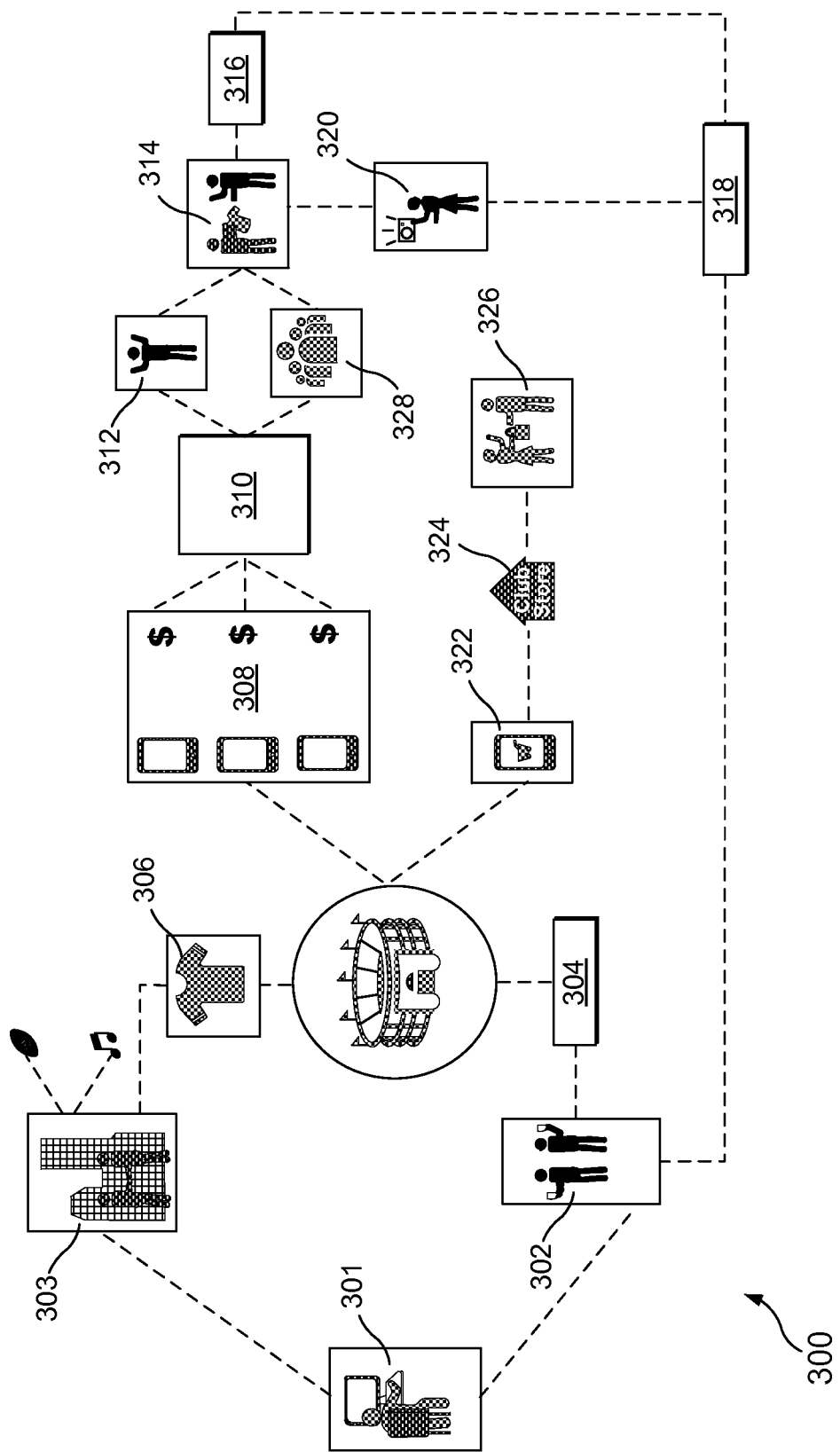
FIG. 3 illustrates a method utilizing a digital mobile application for conducting and/or completing auctions in real-time and/or purchasing items while attending a live event in an embodiment.

A memory, digital storage device and/or non-transitory computer-readable medium (not shown in the drawings) of the database 22, the server 14 and/or the device 8 may have stored thereon the application 10, executable instructions, one or more computer programs, one or more algorithms and/or software (hereinafter "instructions") that, when executed by the microprocessor of the device, perform the one or more steps and/or sub-steps of the present methods and/or processes described herein for conducting and completing one or more computer-implemented auctions in real-time via the system 2 as shown in FIGS. 2-4.

In embodiments, at least a portion of the network 16 may be, or may include, for example, but not limited to, a personal area network (PAN), a local area network (LAN), a campus area network (CAN), a Metropolitan area network (MAN), a wide area network (WAN) and/or the like. In an embodiment, the networks 18, 24 may be a wireless network, such as, for example, a wireless MAN, a wireless LAN, a wireless PAN, a Wi-Fi network, a WiMAX network, a global standard network, a personal communication system network, a pager-based service network, a general packet radio service, a universal mobile telephone service network, a radio access network and/or the like. In an embodiment, at least a portion of the network 16 may be, or may include, but is not limited to, a fixed network, such as, for example, an optical fiber network, an Ethernet, a cabled network, a permanent network, a power line communication network and/or the like. In another embodiment, at least a portion of the network 16 may be, or may include, but is not limited to, a temporary network, such as, for example, a modem network, a null modem network and/or the like. In yet another embodiment, at least a portion of the network 16 may be, or may include, but is not limited to, an intranet, extranet or the Internet which may also include the World Wide Web. The present disclosure should not be limited to a specific embodiment of the network 16.

The application 10 may be, or may include, a computer program, computer instructions and/or software that is designed to run on, or to be executed or performed by, the device 8. The application 10 may be uploaded to, downloaded onto, transmitted to and/or installed on the device 8 via one or more selected from the server, 14, the network 16, the cloud computing system 18 and the database 22. In embodiments, the application 10 may facilitate the opening, conducting and the completing or closing of one or more real-time auctions being conducted at the venue 6 when the device 8 is located or positioned within, near and/or adjacent to venue 6. Any number of users 4 that may be present at, near and/or adjacent to the venue 6 with any number of devices 8 that may opt-in, opt-up, bid and/or partake in the real-time auction being opened, conducted and/or completed or closed via the system 2.

In embodiments, the at least one positioning system 12 is capable of and/or configured to determine, identify and/or calculate the real-time location of the device 8. Thus, if the user 4 attends the event hosted at the venue 6, the at least one positioning system 12 may determine, identify and/or calculate that the device 8 is located or positioned within, near or adjacent to the venue 6. When located within, near and/or adjacent to the venue 6, the device 8 and/or the application 10 are capable of being used to conduct and/or complete the real-time auction taking place at the venue 8. For example, as or after the user 4 enters the venue 8, the user 4 is capable of making and/or placing at least one bid or opting into the auction during when any real-time auctions are being conducted and/or completed before, during and/or after the event being hosted at the venue 6. The positioning system 12 may be connected to and/or in digital communication (not shown in the drawings) the server 14 via the network 16, the cloud computing system 18 and/or other additional digital communication networks (not shown in the drawings). Thus, upon determining that the device 8 is located and/or positioned at, near or adjacent to the venue 6 before, during and/or after the event, the positioning system 12 may communicate and/or transmit the location of the device 8 to the server 14 or at least one digital communication indicating that the device is within, near or adjacent to the venue 6. Subsequently, the server 14 may communicate and/or transmit the internet-accessible resources and/or the one or more digital communications related to one or more real-time auctions being conducted and/or completed before, during and/or after the event at the venue 6. As a result, the user 4 may be informed and/or aware of the one or more real-time auctions, may activate and/or open the application 10 of the device 8, and/or may partake or participate in the one or more real-time auctions by placing one or more bids or opting in during the one or more real-time auctions.

In embodiments, the positioning system 12 may be, or may include, but is not limited to, a global positioning system, a mobile positioning system, a radio frequency tracking or positioning system and/or the like. In embodiments, the positioning system 12 may be, or may include, at least mobile phone trajectory estimation system and/or at least one wireless network, such as, for example, a wireless MAN, a wireless LAN, a wireless PAN, a Wi-Fi network, a WiMAX network, a global standard network, a personal communication system network, a pager-based service network, a general packet radio service, a universal mobile telephone service network, a radio access network and/or the like. In an embodiment, the positioning system 12 comprises the network 16. Moreover, the positioning system 12 determines, identifies and/or calculates the position and/or location of the device 8 with respect to the venue 6 during the event.

In embodiments, the at least one cloud computing system 18 may comprise one or more groups of one or more remote servers (not shown in the drawings) and/or one or more software networks (not shown in the drawings) which may allow centralized data storage and/or online access to one or more computer services and/or resources. In an embodiment, the cloud computing system 18 may be a public system, a private system or a hybrid system. In an embodiment, the cloud computing system 18 may be any computing system capable of providing digital communication between the device 8 and the server 14, the database 22 and/or the account 24.

In embodiments, the server 14 may determine and/or identify that the device 8 is positioned at or within the venue 6 during the live event via communications or transmissions received directly or indirectly from the positioning system 12. The server 14 may communicate with and/or transmit one or more signals or transmissions to the device 8 via the network 16. The networks 16 and/or the server 14 may be local with respect to the device 8 or one or more of the networks 16 and the server 14 may be remote with respect to the device 8 and/or the venue 6. Moreover, the server 14 and the network 16 may be connected via a direct digital communication link or the cloud computing system 18.

The one or more item 20 (hereinafter "item 20") from or at the event, the one or more experiences associated with the event (not shown in the drawings) and/or the one or more upgrades associated with the event (not shown in the drawings) may be offered for sale, sold and/or auctioned at the event and/or venue 6 via the application 10. The internet-accessible resources indicative of or describing the one or more items 20, experiences and/or upgrades may be stored in the database 22 connected and/or in communication with the server 14. The server may access the data from the database 22 and may transmit the data to the device 8 via the network 16 and/or cloud computing system 18. The device 8 may display or render the data to the user 4 via the mobile application 10 installed on, open on and/or executed by the device 8. If desirable, the user 4 may place one or more bids for the item 20, experience and/or upgrade or offer to buy the item 20, experience, and/or upgrade at a price via the mobile application 10. As a result, the bid or offer to buy is transmitted to the server 14 via the networks 16 and/or the cloud computing system 18.

If value or price of the bid or offer to buy proposed by the user 4 is the highest value or price received by the server 14 from all users (not shown in the drawing), then the user 4 wins the auction and purchases the item 20, the experience and/or the upgrade. In an embodiment, the system 2 and/or the method 300 may assign price intervals and/or pricing points, and one or more users 4 may agree, or not agree, to bid at presently assigned price interval pricing point. In other words, the system 2 and/or the method 300 may propose price intervals and/or pricing points, and the winner bidder is the user that agrees to the highest pricing point.

In embodiments, the user 4 completes a financial transaction purchasing the item 20, the experience and/or the upgrade from the server 14 via the application 10. When or immediately after the financial transaction is completed, a commission may be transferred to a third party financial account 24 (hereinafter "account 24") via the server 14. In an embodiment, the account may be owned, may belong to or may be managed by an operator of the venue, a party associated with the mobile device 8, the mobile application 10, the positioning system 12 and/or the server 14, a person associated with or participating in the event at the venue 6 or an organization associated with a person associated with or participating in the event, such as, for example, a charity organization, an educational organization or a political organization.

In embodiments, one or more authentication components (not shown in the drawings) are connected, attached, affixed, adhered and/or added to item 20 before or during the event or before the item 20 is auctioned or offered for sale. As a result, the item 20 may be subsequently authenticated via the one or more authentication components associated with the item 20. In embodiments, the authentication component may comprise at least one printed indicia, such as, for example, a code, a signature, a marking, a symbol, a number, a word or the like. In embodiments, the authentication component may comprise an electronic tag, such as, for example, a wireless transponder, radio-frequency identification tag or the like. The authentication components may be any authentication components capable of subsequently authenticating the item 20.

In an embodiment, the application 10 utilizes a GPS location service existing on the device 8 to identify the event at the venue 6 which the user 4 is attending and automatically streams the available items (i.e., item 20), experiences and/or upgrades for real-time auction to the device 8 via the server 14 and/or the network 16. The users 4, which may be preregistered users, will bid in a quick, simple incremental structure during the auction via the application 10, and the winner of the auction (i.e., winning bidder or user) will be known instantaneously. The user 4 placing the winning bid will pay the winning bid price and collect the memorabilia item onsite at the event, either at breaks in the event, or afterwards at one or more defined locations. In an embodiments, the winning user 4 may have an option to have the auctioned item shipped or transported to a location of chosen by the winning user 4. For an experience and/or an upgrade that the user 4 has won, the user 4 may attend the experience and/or receive the upgrade immediately, at some time during the event, at an intermission or break during the event, and/or at a time sequent to the completion of the event.

In embodiments, the winning bidder or user is the user 4 with the highest auction bid on the auction item 20, experience and/or upgrade posted to the device 8 and/or mobile application 10. A record may be generated of the winning bidder such as a picture which may be uploaded to one or more online social and/or media networks and/or websites. A plurality of non-winning bidders (other users not shown in the drawings) may win one or more pre-arranged items or non-auction items having a specific value or may receive an offer to buy one or more pre-arranged items or non-auction items during the event and/or after completion of the event. Any registered user attending the event may be purchase other non-auctioned items associated with the live via an on-line store associated with and accessible via the application 10 or a merchandizing store associated and/or located within the venue 6. The registered user may collect merchandize purchased at the merchandizing store during the event, before leaving or exiting the venue 6 or the purchased merchandize may be shipped and/or delivered to a location or address associated with the registered user and/or selected by the registered user.

As shown in FIG. 2, a process or method 100 (hereinafter "method 100") for opening, activating, accessing, executing and/or registering the application 10 that was previously stored within the memory device and/or installed on the device 8. The method 100 may have, include and/or comprises a plurality steps and/or substeps that may be divided or grouped into a plurality of step levels. In an embodiment, the method 100 has, includes and/or comprises Level 1, Level 2, . . . , Level N−1 and Level N. One lever, such as, Level 1 may comprise and/or include at least one selected from a Log in step 102, a Register step 104 and/or a ID password step 106.

A first-time user of the application 10, such as, user 4 may have to provide general, personal and/or financial information during the Register step 104. The general and/or personal information may be necessary to setup, register, validate and/or establish an account for utilizing the application 10 installed on the device 8. The general and/or personal information may be inputted into the device 8 by the user 4 and/or may be transmitted to the server 14 which may be owned and/or operated by, for example, a provider, a seller and/or a distributor of the application 10. The general and/or personal information may be inputted in the application via an information input step 110, an on-site representative step 112 and/or a representative information step 114 which may be included in another level, such as, for example, Level 2. The information inputted and/or provided during the information input step 110 may be, include and/or comprise, but is not limited to, information related and/or associated with an identification of the user 4 utilizing the application 10, an e-mail address of the user 4, a password selected by the user 4, one or more telephone, mobile and/or telefax numbers belonging to, associated with and/or accessible by the user 4, a taxpayer ID of the user 4, information related to at least one financial account owned by, associated with and/or managed by the user 4, information related to at least one online or web-based financial payment account owned by, associated with and/or managed by the user 4 and/or information related to, based on and/or associated with a mailing or shipping address of the user 4 and/or preferred shipping information of the user 4. The information related to at least one financial account of the user 4 may be, may include and/or may comprise, one or more credit and/or debit card numbers, one or more names, one or more expiration dates, one or more security codes and/or one or more billing addresses. It is to be understood that the present disclosure is not to be limited to a specific embodiment of the general and/or personal information provided by the user 4 during the information input step 110.

The on-site representative step 112 may ask the user 4 if he/she is interested in becoming an on-site representative associated with the application 10, the venue 6, the owner and/or operator of the application 10 and/or the owner and/or operator of the venue 6. If the user 4 chooses or selects "no", the method 100 proceeds to another level of steps, such as, for example, Level N−1 which may include a my account step 120. If the user 4 chooses or selects "yes", the method 100 may proceed to the representative information step 114 which may require the user 4 to enter or provide additional information associated with the user 4. The additional information may include and/or comprise, but is not limited to, at least one selected from an entity name, an account number, an ID number, first and last names, names of one or more educational institutions, career information and/or at least one telephone number. After the additional information is inputted into and/or provided to the application 10, the method 100 proceeds the my account step 120.

Level 2 may comprises information associated with (i) the user (ii) methods of payment for financial transactions and (iii) entity account information and/or a solicitation to become a representative associated with the mobile application 10. Level N−1 may comprise and/or include, but is not limited to, the My Account step 120 which provides specific details associated with, relating to and/or based the account of the application 10 registered by the user 4. Further, Level N−1 may include one or more of the following steps and/or substeps, but is not limited to, a setting step 122, an active bids step 124, an events step 126 and/or a favorite step 128. The application 10 may provide and/or display the setting step 122, the active bids step 124, the events step 126 and/or a the favorite step 128 as one selected components, features, dropdown lists and/or tabs that are accessible and manipulatable by the user 4 via the GUI of the device while the application is open, activated and/or being executed. The setting step 122 may allow the users 4 to select one or more preferences with respect to the settings and/or parameters of the applications 10. The active bids step 124 may provide and/or display one or more active bids or opt-ins that may have placed by user 4 during one or more real-time auctions via the application 10 and/or device 8. The events step 126 may provide and/or display a list of previous events, present events and/or future events that may be attended by the user 4. The favorite step 128 may allow the user 4 to set and/or establish additional preferences associated with the account, one or more real-time auctions and/or goods and/or services that may be preferred and/or desirable to the user 4.

Level N may comprise at least a category step 130 which may be provided as component, feature, pulldown list and/or tab assessable via the application 10 and/or manipulate via the GUI of the device 8. The category step 130 may allow the user 4 to select, establish and/or identify one or more categories that may be associated with or indicative of the venue 6, the event been held at the venue 6, other events and/or goods and/or services at may be auctioned that are preferred and/or desirable to the user 4.

FIG. 3 illustrates a method 300 for conducting and/or completing one or more computer-implemented auctions in real time. As shown in FIG. 3, a plurality of users 4 may download, install, access and/or execute a plurality of applications 10 and register accounts with the applications 10 via a plurality of the devices 8 as shown at step 302. The users 4 may post or publish to a website that the applications 10 have been downloaded and registered by the users 4 via the device 8. A portion of the plurality of users 4 may be present or in attendance at the venue 6 during the event as shown at step 304 and the positioning system 12 may determine, identify and/or calculate that the users 4 are present at and/or attending the event at the venue 6. The positioning system 12 may communicate with the server 14 and/or notify the server 14 that a portion of the plurality of the device 8 are present or located within, near and/or adjacent to the venue 6. While attending the event at the venue 6, the user 4 may activate, open, execute and/or launch the applications 10 installed on the devices 8, and the system 2 may notify the user of one or more upcoming and/or active or open computer-implemented auctions being held, conducted and/or completed at the venue 6 during the event. In embodiments, the system 2 may transmit at least one selected the digital communications and/or internet-accessible resources relating the one or more real-time auctions to the devices 8. As a result, the users 4 may be informed about one or more real-time auctions taking place at the venue during, before and/or after the event. Once a real-time auction has begun and/or opened, each of the users 4 may place one or more bids in the real-time auction by utilizing the device 8 and application 10. The highest winning bid during the real-time auction will win and/or buy the goods and/or services featured in the real-time auction which may include the item 20, the one or more experiences and/or the one or more up-grades.

In embodiments, after the positioning system 12 has determined that the device 8 is located at, near and/or adjacent to the venue 6 before, during and/or after the event, the user 4 may execute, open and/or activate the application 10 via the GUI of the device 8 and/or may register as an auction bidder for at least one real-time auction being conducted and/or completed via the application 10 installed on the device 8. The application 10 may be stored in an internal memory of the device 8 and may be accessed by other components of the device 8 such that the application 10 can be executed and utilized by the user 4 during the event and/or while being located at, near and/or adjacent to the venue 6 hosting the event.

In embodiments, the system 2 and/or the method 300 may be utilized by the users 4 to launch, open, access, activate and/or execute the applications 10 for marketing, auctioning and/or selling one or more items 20, one or more experiences and/or one or more upgrades in real-time at the event held at the venue 6. In embodiment, the application 10 comprises a user-friendly and/or simple interface which enables the users 4 to bid or opt-in into one or more real-time auctions for one or more of the items 20 from the event being hosted by the venue 6, for experiences associated with the event and/or for upgrades associated with the event. The system 2, the method 200 and/or the method 300 facilitate auctioning or selling of one or more of the items 20, the experiences and/or upgrades associated with the event to the users 4 that are attendees at the venue 6 before, during and/or after the event.

In embodiments, the item 20 may be, or may include, but not limited to, one or more actual memorabilia items and/or one or more souvenir items present at or used in or during the event being hosted by the venue 6. For example, the item 20 may be, but is not limited to, one or more sports jerseys, one or more balls, one or more bats, one or more sneakers, one or more drumsticks, one or more guitars, one or more performer costumes, and/or the like. It should be understood that the present disclosure is not limited to a specific embodiment of the item 20. Moreover, the item 20 may be any memorabilia item or souvenir item as known to one of ordinary skill in the art.

The system 2 and/or the method 300 facilitate auctioning or selling of the one or more experiences (hereinafter "experiences") that may take place or occur during the event which is hosted at the venue 6. In embodiments, the experiences may be, or may include, but are not limited to, a real life experience that may take place and/or occur, for example, during a break or intermission at the event and/or after completion of the event. For example, the experiences may be, or may include, but is not limited to, a halftime basketball shoot for an award and/or prize, a personalized message from a public address announcer during a game, a tour of one of the team's locker room after the game and/or lunch with at least one person associated with the event, such as, a team coach at a sequent date and/or location. It should be understood that the present disclosure is not limited to a specific embodiment of the experiences that may take place or occur before, during and/or after the event that is hosted at the venue 6.

The system 2 and/or the method 300 facilitate auctioning or selling of the one or more upgrades associated with the event which is hosted at the venue 6 and/or the venue itself. In embodiments, the one or more upgrades associated with the event may be, or may include, for example, but are not limited to, a seat upgrade that allows the winning bidder to experience the event at a seat, booth and/or box that is located closer to the event than the originally purchased seat, booth and/or box. In embodiments, the upgrades may be directed to concessions being provided by and/or at the venue 6 before, during and/or after the event. Thus, one user of the plurality of users that are in attendee of the event may buy or win the auction of upgrades that may enhance and/or improve the experience at the event being hosted at the venue 6. As a result, the overall experience from attending the event at the venue 6 may be enhanced and/or improved by the system 2 and/or the method 300. It should be understood that the present disclosure is not limited to a specific embodiment of the one or more upgrades associated with the event and/or being hosted by the venue 6.

The method 300 comprises developing the application 10 as shown at step 301 of FIG. 3 which may be downloaded and installed on the devices 8 of the users 4 as shown at step 302. The owner/operator, supplier, manufacturer and/or distributor of the application 10 or another individual may enter into one or more agreements with one or more organizations and/or individuals that may be associated with the event and/or the venue 6 as shown at step 303. The one or more agreements may provide and/or facilitate the real-time auctions at the venue 6 and/or before, during or after the event held at the venue. Further, the one or more agreements may be formed so that the applications 10 may be used during one or more specific live event that subsequently held at the venue 6. The event may comprise a sports event and/or an entertainment event.

In an embodiment, the system 2 may post, open and/or push a first real-time auction to the applications 10 installed on and launched by the devices 8 of the users 4 in attendance of the event at the venue 6 as shown at step 306. More than one of the users 4 at the event may place or make bids or opt-in while the real-time auction is open as shown at step 308, and the placed bids may be transmitted to the server 14 and/or stored in the database 22 as shown at step 310. The highest bid that was placed during the real-time auction will win the real-time auction and pay or buy the goods and/or services offered for sale during the real-time auction as shown at step 312. The winning user 4 that won the real-time auction with the highest bid may by receive the goods and/or services while at the venue 6 as shown at step 314. The winning user 4 may create, write and/or producing a personal story or written description associated with, based on and/or related to the event, the venue 6 and/or the goods and/or services of the auction as shown at step 316. The personal story or written description may be uploaded and/or posted to one or more websites, such as, for example one or more social networking websites as shown at step 318. A representative or individual associated with the application 10 and/or the venue 6 may record and/or publish real-time auction experience of the winning user 4 which may be published or posted on the one or more websites as shown at step 320.

In embodiments, the systems 2 and the method 300 may facilitate a "get it now" sale feature for one or more the items, experiences and/or upgrades which upon selecting and/or activating the feature may result in immediate purchase and sale of the one or more items, experiences and/or upgrades and/or immediate closure or termination of the real-time auctions.

In embodiments, one or more of the items, the experiences and/or the upgrades may be offered for sale without being included in the real-time auction (hereinafter "non-auction items, experiences and/or upgrades"). The application 10 may display the one or more non-auction items, experiences and/or upgrades at any time during the event or while the device is present or located within, near or adjacent to the venue 6 as shown at step 322 in FIG. 3. Any users 4 attending the event may purchase the one or more non-auction items, experiences and/or upgrades via the application 10 at any time before, during and/or after the event at the venue 6 as shown at step 324. After purchasing the non-auction items, experiences and/or up-grades, the purchasing users 4 may pick up and/or redeem the non-auction items, experiences and/or upgrades at one or more locations in or adjacent to the venue 6 as shown at step 326.

In embodiments, the non-auction items, experiences and/or upgrades may only be available for purchase by the users 4 that bid in the real-time auctions but failed to win the real-time auction (hereinafter "non-winning bidders") as shown at step 328. The non-winning bidders may win other auction items, experiences and/or upgrades or non-auction items, experiences and/or upgrades. The winning bidder and/or non-winning bidders may collect purchased/auctioned items, attend the experience and/or receive the upgrade at an on-site delivery location within the venue. Alternatively, registered users (hereinafter "non-bidders") may purchase items during the event from an online club shop as shown at steps 322, 324, 326 via the application 10 and the device 8. The non-bidders may pick up purchased items, attend the experience and/or receive the upgrade at the club store, at another location within the venue 6 or at a location that may be remote to the venue 6. A representative may record and/or photograph the users 4 collecting auctioned/purchased memorabilia, attending the experience and/or receiving the upgrade and post the record to one or more online social website as shown at step 320. The user that collected auctioned/purchased memorabilia, attended the experience and/or received the upgrade may post, for example, a personal story of the auction experience to the one or more websites.

The non-auction items, experiences and/or upgrades made available for purchase may be the same as, substantially the same as, similar to, related to and/or associated with the one or more items, experiences and/or upgrades that were feature in the real-time auction. For example, a baseball autographed by baseball player X may have been auctioned off during the real-time auction, and the non-auction items for sale for immediate purchase via the application 10 may comprise other autographed baseball and/or other items associated with and/or autographed by baseball player X. In embodiments, monetary values of or prices associated with the non-auction items, experiences and/or upgrades made available for purchase may be the same as, substantially the same as, similar to, related to and/or associated with the monetary values of or prices associated with the one or more items, experiences and/or upgrades that were feature in the real-time auction. For example, an autographed baseball may have been auctioned off for $100 during the real-time auction, and the non-auction items may comprise autograph baseball costing less than or equal to $100.

In embodiments, the application 10 may be a free or purchasable mobile application and/or may earn revenue on a sales commission model. The application 10 may earn commissions on the gross sales of the auctioned goods and/or services, with a seller retaining at least a portion of the proceeds generated by the real-time auctions completed via the application 10. For example, the seller may retain a majority of the proceeds generated. The goods and/or services to be auctioned may be currently not sold actively in the marketplace or may be sold at less than optimal values through inefficient informal charity auction platforms. The cost of the goods and/or services to the sellers may be very low and the expected revenue to be earned may provide wide gross margins. For example the gross margins may be in excess of 100% of the costs of the goods and/or services.

In embodiments, a cost structure of business generated via the application 10 may be highly variable. Fixed costs may remain moderate, as there may be no or little overhead required to manage the auction services associated with the application 10 and/or due to the highly efficient technological infrastructure. The commission based revenue model may require limited working capital and/or zero inventory financing. Marketing and advertising may be planned to be largely word of mouth. The most significant operating cost may be a personal representative associated with the mobile application 10 that may be present at each live event to identify the goods and/or service for sale during the real-time auctions, authenticate the goods and/or services and handle the physical transfer the purchased goods and/or service to the winning bidders. In embodiments, the personal representative may logistically organize, facilitate and/or execute the auctioned items, experiences and/or upgrades immediately upon close of the real-time auctions, subsequently during the event, at an intermission or break in the event or at date subsequent to the completion of the event. In an embodiment, the representative may supervisor auctioned items deliveries, experience attendances and/or the upgrades received or may record and/or publish related information, photos and/or video to the one or more online websites. For example, a representative may post the auction items (i.e., item 20), experiences and/or upgrades to the mobile application 10 during the live event at the venue 6. The representatives may be temporary representatives of the company associated with the application 10 on a contract basis, sourced from each region/school or venue location or may be permanent representatives of the company.

In embodiments, a backbone of the service associated with the application 10 will be based on ubiquitous existing technology. The user interface of the application 10 may be iOS, Android, both major smartphone platforms, other smartphone platforms or combinations thereof. Users 4 will be notified of available items, experiences and/or upgrades for bid by one or more digital communications received by the device via the application 10. The one or more digital communication may comprise, for example, one or more banner updates, one or more text messages, and/or one or more emails, with direct or indirect active links to one or more real-time auctions underway or about to begin and/or the internet-accessible resources associated to the one or more real-time auctions underway or about to begin. The registration method 100 shown in FIG. 2 which requires credit card authorization may allow seamless bidding on auctioned items 4, experiences and/or upgrades without time delay via the application 10 and/or the device 8.

In embodiments, the services associated with the application 10 may utilize word of mouth and the public collection of the auctioned items, experiences and/or upgrades to popularize the application 10 and to gain new users of the application 10. The winning bidders may collect the auctioned items, experience and/or upgrade in a public fashion or mention, like at halftime on the field, which could be announced at the venue. This public fashion or mention may incentivize many new bidders at the live events to join the services associated with and provide by the application 10 to attempt to win or buy subsequent items, experiences and/or upgrades for auction. Even a relatively low 10% adoption rate by attendees at these events may result in hundreds of thousands of new users in a year of operation of the application. As the numbers of users increase and bid values on items, experiences and/or upgrades increase resultant from this demand, more event coordinators of live events and/or venues will be interested to utilize the services provided by the application 10, compounding the "free" advertising provided by the winning bidders public collection of the auctioned items, attendance of the experiences and reception of the upgrades.

In embodiments, the application 10 may provide sellers of items, experiences and/or upgrades with the ability to allocate a portion of the revenues earned to associated organizations (i.e., the charitable cause of their choosing). Potential bidders may feel less reluctance to bid higher prices for auctioned items, experiences and/or upgrades because a least a portion of the proceeds generated by the real-time auctions may support or help to support a charitable and/or a good cause. This aspect may be particularly interesting for musicians and bands that often use their public profile to raise awareness and money for various charitable organizations. The sale of otherwise "worthless" used costumes, T-shirts, drumsticks, instruments, set props, etc. to users of the application 10 may be a cost-free way to publicly improve their profile and advance the charitable organizations. Buying auctioned items, experiences and/or upgrades sold by, for example, universities, as not-for-profits, may allow users of the application 10 to claim tax liability off-sets.

In embodiments, one challenge may be negotiating and securing supply contracts and/or agreements with the event coordinators. The targets of such contracts and/or agreements may be, for example, major university sports and organizers of live music concerts. Parties and/or individuals associated with the mobile application 10 may seek to negotiate exclusive marketing rights in this format provided by the application 10. The parties and/or individuals may discuss and/or consider the services provided by the application 10 with, for example, several university sports conferences and/or teams within the conferences, as well as, for example, record labels and/or the artists represent by the record labels.

In embodiments, the services of the mobile application 10 may be effective for a wide variety of live event formats. Widespread utilization by universities and colleges for all sports may be targeted in stage two development. For example, high school sports, Broadway shows, NASCAR races, Hollywood premieres may be potential markets. In another example, international sporting events, Formula One races, political events may be high profile markets for the auction services provided by the application 10. The potential universe of event driven real-time auctions may be extremely diverse and may provide significant growth opportunities.

In embodiments, the items, experiences and/or upgrades of the real-time auctions may be separated, divided and/or included in a plurality of tiers which may be based on amounts of opening bids and/or other factors associated with the auctioned items, experiences and/or upgrades. For example, the system 2 and/or method 300 may utilize two or more tiers. For example, the system 2 and/or method 300 may utilize Tier 1, . . . , Tier N and Tier N−1 for auctioning one or more of the items, experiences and/or upgrades. The number of tiers utilized by the system 2 and/or method 300 may be any number of tiers as known to one of ordinary skill in the art.

In embodiments, Tier 1 may include, for example, a halftime shot, lunch with a coach, a game ball signed by a coach and/or player, a game ball (i.e., a "Dunk of the Game" ball), a picture with a sports team or an entertainment troop on court or stage, a locker room tour or the like.

In embodiments, Tier N−1 may include one or more secondary experiences and game-day items, such as, for example, a "shout out" or personalized message from team social media website, an enhanced ticket upgrade, (i.e., a "Loaded" ticket upgrade allowing all you can eat and/or drink from vendors at the event), a picture on the court during halftime and/or the end of the game, a picture in the home team locker room, a visual display of the winner (i.e., Jumbo Tron dance solo), a personalized message from the public address announcer during game or event, a practice uniform from the home or visiting team, an autographed picture, a previous game used jersey, an event program or the like.

In embodiments, Tier N may include Tier 3 will include collectible items specifically related to the home team, the away team or both, such as, for example, a sweatshirt, a baseball cap, a polo shirt, a long sleeve women's T-shirt, a men's T-shirt, a bucket hat, a hat, shorts, a visor, a tie, a ladies necklace, flip flops, a smartphone case, a golf glove, crew socks, license plate cover, a bottle opener and/or keychain, a flag, a watch, a clock, a basketball, a game set, a duffle bag, a backpack, headphones and/or the like. In embodiments, the collectible items of Tier 3 may include items associated with clothing, an office, a home, a vehicle, jewelry, outdoor wear, foot wear, personal electronics, home electronics, hunting, fishing, camping, travel, outdoor sports activities, indoor entertainment activities, food, beverages, home furnishings, office furnishing, sports equipment or the like.

In embodiments, the collectible items of Tier 3 may be referred to as secondary items that may be offer for sale to non-winning bidders or users that failed to win a real-time auction. The system 2 and/or the method 300 may determine, identify and/or select specific Tier 3 items to offer for sale to the non-winning bidders or users based on data gathered and/or collected by the system 2 and/or the method 300 during or through one or more real-time auctions. The gathered and/or collected data may include, but is not limited to, at what price point(s) the non-winning bidders or users dropped out of the real time auction(s), what type of items, experiences and/or upgrades do the non-winning bidders or users typically or preferably bid on, and/or the like.

In embodiments, the group of users 4 capable of participating in the real-time auctions via the application 10 may not be solely based on the location of the users 4. For example, the group of users 4 may comprise users of the application 10, members of a fan club or group, members of a fan base, season ticket holders of the venue 6, members of an organization, association, unions and/or the like. It should be understood that the present disclosure is not deemed as limited to a specific embodiment of the group of users capable of utilizing the application 10 to participate in one or more real-time auctions.

In embodiments, the system 2 and/or method 300 may be utilized to facilitate and/or conduct a flash bid auction in real-time. During the flash bid auction, a time increment drives the auction bidding process by increasing the price points for every passage of the time increment. For example, the flash bid auction may begin for an auctioned item, experience and/or upgrade and the opening bid may be a first price point or dollar amount. The users 4 may place a first bid or opt-in for the first dollar amount. Then, a time increment may pass and bid may be increased to a second dollar amount. One or more users 4 may place a second bid or opt-in for the second dollar amount, and/or one or more users may opt-out or not place a second bid for the second money amount. Then, after another passage of the time increment, the bid may be increased to a third money amount. The bids continue to increase over the length of the auction until a single user 4 is the only bidder remaining in the flash bid auction whereby that single user becomes the winning bidder and wins or buys the auctions item, experience and/or upgrade.

In embodiments, the time increment may be greater than one second and less than one hour. In additional embodiments, the time increment may be greater than ten seconds and less than forty-five minutes. In yet additional embodiments, the time increment may be at least thirty seconds and less than five minutes. In an embodiment, the time increment may be automated based on algorithmic calculation, data collected by the system 2 and/or the method 300 and/or data related.

The system 2 and/or the method 300 may collect and/or store data and/or information, via the database 22, relating to, associated with and/or based on one or more opt-out price points of the users. In other words, the opt-out price points may be the price points at which one or more users opt-out of one or more flash bid auctions. The system 2 and/or method 300 may utilize this data and/or information to offer one or more secondary items, experiences and/or upgrades for sale to the users that opt-out of the one or more flash bid auctions. The secondary items, experiences and/or upgrades may be related to auctioned item, experience and/or upgrade of the one or more flash bid auctions but may have price point equal to, substantially equal to, similar to, less than or greater than the opt-out price points of the one or more user that have opted-out of the one or more flash bid auctions.

For example, the system 2 and/or the method 300 may facilitate a flash bid auction that may have a start price point at 1 USD, then the price point may move up in predetermined intervals, such as, for example, the time increment to one or more higher price points. With each higher price point, the users each have an opportunity to "opt-in" by bidding or opt-out by allowing the timer to expire via the system 2 and/or the method 300. As the price points move higher price points and/or even higher price points, more users will opt out, eventually leaving only one winning bidder for the flash bid auction.

In embodiments, at each price level the bidders opt-out, such as, for example, the opt-out prices, the system 2 and/or the method 300 may target those users that opted-out with an offer to buy a similar type of item, such as, for example, the one or more secondary items, experiences and/or upgrades at the price points at which those users last opted-in or placed a bid. As a result, the system 2 and/or the method 300 may identifying how much money, or at what price, each user is willing to pay for a given auction item, experience and/or upgrade and may target sell those users similar secondary items at similar price points that those users have already demonstrated willingness to pay or buy.

For example, if a bidder for the baseball player's actual bat that he used hit the last "walk-off" single in game X was willing to pay 500 USD, but not 1000 USD, the system 2 and/or the method 300 may immediately offer that bidder a baseball bat signed by that baseball player for 450 USD, which is just below the price point that bidder last proactively opted-in or placed bid in the flash bid auction for the actual bat from game X.

In another example and as discussed above, the flash bid auction allows the time increments to drive the real-time auction process, rather than user bids. A signed baseball jersey is placed into a real-time flash bid auction at a baseball stadium X during a live baseball game via the system 2 and/or the method 300. The jersey is set to start at a price point of 15 USD and the flash bid auction is set to go live on the application 10 at 7 PM EST. At 7 PM EST, the jersey appears on the application 10 of the device 8 to all attendees or the users 4 present at the baseball stadium X. In an embodiment, the auctioned item (i.e., the jersey) may appear as a digital image or card on the device 8 with basic info, such as, for example, one or more pictures, description, etc., via the application 10. At 7 pm EST the auction starts and all users at the event have the opportunity to "bid" or "opt in" to the auction by agreeing to the $15 start price. After 30 seconds, the users that agreed to the 15 USD price point by bidding or opting-in to the flash bid auction receive a digital notification that the flash bid auction is now moving up to a 30 USD price point. The users then have an additional 30 seconds to "bid" or "opt in" at the 30 USD price point. Any users who did not "bid" are considered out of the flash bid auction. After another 30 seconds, the users that agreed to the 30 USD price point receive another digital notification that the flash bid auction is now moving up to a 60 USD price point. The users then have an additional 30 seconds to bid or opt in at the 60 USD price point. The flash bid auction process continues at 30 second intervals with the price increasing at set increments, such as, increasing the price point by 100% after each time interval passes or expires, until only single user is left or remains in the flash bid auction (i.e., the user that agrees to pay the highest price point. All users who lost, opted-out or dropped out of the flash bid auction prior to the highest price point will be offered the one or more secondary item, experiences and/or upgrades based the collected data and/or information of those users, such as, for example, the opt-out price point of those users. In embodiments, the system 2 and/or the method 300 may utilize the collected data and/or information to develop, build, create and/or produce a user profile which may comprise, for each user, one or more selected from at least one bidding behavior, one or more price point thresholds, one or more product interests. Thus, the secondary offers made to the user that opted-out of the flash bid auction by the system 2 and/or method 300 may be based on one or more components of the developed user profile. As a result, the secondary offers may be substantially targeted and/or relevant to the one or more users that opted-out of the flash bid auction.

It will be appreciated that several of the above-disclosed and other features and functions, or alternatives thereof, may be desirably combined into many other different systems and/or methods. Also, various presently unforeseen or unanticipated alternatives, modifications, variations or improvements therein may be subsequently made by those skilled in the art, and are also intended to be encompassed by the present disclosure.

The invention claimed is:

1. A computer-implemented method of conducting and/or completing one or more real-time auctions during a live event hosted at a venue, the method comprising:
providing digital mobile application software accessible via a cloud computing system;
uploading, downloading or transferring, and installing, the digital mobile application software to a plurality of digital mobile devices via the cloud computing system;
determining, via at least one positioning system, that the plurality of digital mobile devices is located within or near the venue during the live event, wherein the at least one positioning system is selected from the group consisting of a global positioning system, a mobile positioning system, and a radio frequency tracking or positioning system;
automatically transmitting at least one internet-accessible resource and at least one digital communication to each digital mobile device from a computer server immediately at a beginning of a real-time auction during the live event, wherein the at least one internet-accessible resource is indicative of an auction item and/or service of the real-time auction and the at least one digital communication indicates that the real-time auction has begun;
receiving, at the computer server, auction bids for the real-time auction from the plurality of digital mobile devices located within or near the venue during the live event;
driving an auction process of the real-time auction that is conducted via, at least in part, the plurality of digital mobile devices during the live event by, at least in part, predefined time increments such that a highest auction bid of the real-time auction increases with each predefined time increment of the auction process; and
excluding at least one digital mobile device of the plurality of digital mobile devices from the auction process of the real-time auction based on at least one auction bid received or not received at the computer server from said at least one excluded digital mobile device,
wherein the plurality of digital mobile devices executes the digital mobile application software to receive the at least one internet-accessible resource and the at least one digital communication and transmit the auction bids and wherein the live event is a live sports event and/or a live entertainment event.

2. The method according to claim 1, wherein at least one positioning system determines that the plurality of digital mobile devices is located within or near the venue during the live event.

3. The method according to claim 1, further comprising:
identifying a winning auction bid received from one digital mobile device of the plurality of digital mobile devices located within or near the venue during the live event, wherein the winning auction bid is a highest auction bid of the auction bids for the real-time auction received at the computer server.

4. The method according to claim 1, wherein the auction item and/or service of the real-time auction comprises one or more collectible memorabilia items, one or more experiences associated with the live event and/or the venue and/or one or more upgrades associated with the live event and/or the venue.

5. The method according to claim 1, further comprising:
offering a secondary good or service for sale to the at least one excluded digital mobile device excluded from the auction process of the real-time auction, wherein the offered secondary good or service is based on data or information collected by the computer server with respect to the at least one excluded digital mobile device excluded from the auction process of the real-time auction.

6. The method according to claim 5, wherein the data or information collected by the computer server comprises a highest auction bid of the auction bids transmitted by the at least one excluded digital mobile device before being excluded from the auction process of the real-time auction.

7. A computer-implemented method of conducting and/or completing one or more real-time auctions during a live event hosted at a venue, the method comprising:
determining via at least one positioning system, that a plurality of digital mobile devices is located within or near the venue during the live event, wherein the at least one positioning system is selected from the group consisting of a global positioning system, a mobile positioning system, and a radio frequency tracking or positioning system;
automatically transmitting at least one internet-accessible resource and at least one digital communication to each digital mobile device from a computer server immediately at a beginning of a real-time auction during the live event, wherein the at least one internet-accessible resource is indicative of an auction item and/or service of the real-time auction and the and at least one digital communication indicates that the real-time auction has begun;

receiving, at the computer server, auction bids for the real-time auction from the plurality of digital mobile devices located within or near the venue during the live event;

driving an auction process of the real-time auction during the live event by, at least in part, predefined time increments, wherein passage of each predefined time increment increases a price point of the auction process for the real-time auction; and excluding at least one digital mobile device of the plurality of digital mobile devices from the auction process based on at least one auction bid received or not received at the computer server from said at least one excluded digital mobile device, wherein the plurality of digital mobile devices executes installable digital application software to receive the at least one internet-accessible resource and at the least one digital communication and transmit the auction bids, wherein the digital application software is accessible and installable by the plurality of digital mobile devices via a cloud computing system associated with the plurality of digital mobile devices.

8. The method according to claim 7, further comprising:

building a user profile, based on user data and/or information collected by the computer server, consisting of at least one component selected from at least one bidding behaviour, one or more price point thresholds and one or more product interests, wherein the user profile is associated with a user of the digital mobile application software; and providing a secondary offer to the user via the digital mobile application software, wherein the secondary offer is based on the at least one component of the built user profile.

9. A computer-implemented method of conducting and/or completing one or more real-time auctions during a live event hosted at a venue, the method comprising:

determining, via at least one positioning system, that the plurality of digital mobile devices is located within or near the venue during the live event, wherein the at least one positioning system is selected from the group consisting of a global positioning system, a mobile positioning system, and a radio frequency tracking or positioning system;

automatically transmitting at least one internet-accessible resource and at least one digital communication to each digital mobile device, for a primary auction item and/or service, from a computer server immediately at a beginning of a real-time auction during the live event, wherein the at least one internet-accessible resource is indicative of the primary auction item and/or service of the real-time auction, the at least one digital communication indicates that the real-time auction has begun and the primary auction item and/or service of the real-time auction comprises one or more collectible memorabilia items, one or more experiences associated with the live event and/or the venue and/or one or more upgrades associated with the live event and/or the venue;

receiving, at the computer server, auction bids for the real-time auction from the plurality of digital mobile devices located within or near the venue during the live event, wherein the plurality of digital mobile devices executes installable digital mobile application software to receive the at least one internet-accessible resource and at least one digital communication and transmit the auction bids, wherein the digital mobile application software is accessible and installable by the plurality of digital mobile devices via a cloud computer system;

excluding at least one digital mobile device of the plurality of digital mobile devices from an auction process of the real-time auction based on at least one auction bid received or not received at the computer server from said at least one excluded digital mobile device; and selecting a secondary good or service to offer for sale to the at least one excluded digital mobile device excluded from the auction process of the real-time auction based, at least in part, on data or information collected by the computer server with respect to the at least one auction bid received or not received at the computer server from the at least one excluded digital mobile device.

* * * * *